(12) United States Patent
Kobayashi et al.

(10) Patent No.: US 9,061,510 B2
(45) Date of Patent: Jun. 23, 2015

(54) LIQUID EJECTING APPARATUS

(71) Applicant: SEIKO EPSON CORPORATION, Tokyo (JP)

(72) Inventors: Satoru Kobayashi, Matsumoto (JP); Ken Yamagishi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/324,474

(22) Filed: Jul. 7, 2014

(65) Prior Publication Data

US 2015/0015647 A1    Jan. 15, 2015

(30) Foreign Application Priority Data

Jul. 9, 2013   (JP) ................. 2013-143291

(51) Int. Cl.
*B41J 2/175*   (2006.01)

(52) U.S. Cl.
CPC .................... *B41J 2/17563* (2013.01)

(58) Field of Classification Search
CPC ............... B41J 2/17563; B41J 2/17503; B41J 2/17513; B41J 2/19
USPC .......................... 347/84–87, 92–93
See application file for complete search history.

(56) References Cited

U.S. PATENT DOCUMENTS

| | | | |
|---|---|---|---|
| 6,120,140 A * | 9/2000 | Hirosawa et al. | 347/93 |
| 6,190,009 B1 * | 2/2001 | Kitahara | 347/93 |
| 6,217,164 B1 | 4/2001 | Hino | |
| 6,270,205 B1 | 8/2001 | Takata | |
| 6,520,633 B2 * | 2/2003 | Nakamura | 347/93 |
| 2003/0146958 A1 | 8/2003 | Aruga et al. | |
| 2010/0053286 A1 | 3/2010 | Ito | |
| 2012/0038721 A1 | 2/2012 | Yokouchi | |
| 2012/0050424 A1 | 3/2012 | Nabeshima | |

FOREIGN PATENT DOCUMENTS

| | | |
|---|---|---|
| JP | 2000/198215 | 7/2000 |
| JP | 2001/018419 | 1/2001 |
| JP | 2002/067353 | 3/2002 |
| JP | 2010/058320 | 3/2010 |
| JP | 2012/040696 | 3/2012 |
| JP | 2012-045725 | 3/2012 |
| WO | 03/041964 | 5/2003 |

* cited by examiner

*Primary Examiner* — Juanita D Jackson
(74) *Attorney, Agent, or Firm* — Workman Nydegger (57) ABSTRACT

Provided is a liquid ejecting apparatus that includes a liquid ejecting head having nozzles through which liquid can be ejected, a liquid supply path through which the liquid is supplied to the liquid ejecting head, and a filter chamber which is disposed in the middle of the liquid supply path and of which an inner portion is divided into a first chamber on a downstream side and a second chamber on an upstream side by a filter which filters the liquid, in which a liquid outlet through which the liquid is introduced from the first chamber of the filter chamber to a downstream side of the liquid supply path is formed in an upper position of the first chamber in a vertical direction.

11 Claims, 4 Drawing Sheets

LIQUID EJECTING APPARATUS

BACKGROUND

1. Technical Field

The present invention relates to a liquid ejecting apparatus in which liquid which is supplied through a liquid supply path in which a filter for filtering the liquid is provided is ejected from nozzles formed on a liquid ejecting head.

2. Related Art

In recent years, an ink jet type printer (a liquid ejecting apparatus) in which ink (liquid) is ejected onto a target such as a paper sheet from nozzles formed on a liquid ejecting head has been known. In such a printer, ejection properties of ink through the nozzles of the liquid ejecting head are ensured in such a manner that a filter chamber in which a filter is accommodated is provided in the middle of a liquid supply path through which liquid is supplied to the liquid ejecting head and foreign matter or air bubbles in the liquid which flows from an upstream side to the filter chamber are collected by the filter.

In an ink jet type printer disclosed in, for example, JP-A-2012-45725, a filter is horizontally disposed in a filter chamber, and thus the filter chamber is divided into a first chamber on a downstream side and a second chamber on an upstream side by the filter. An ink discharge opening (a liquid outlet) through which ink flows from the first chamber on the downstream side to the liquid ejecting head side is provided downward at a position separate from the filter and an ink supply opening (a liquid inlet) through which the ink flows from an upstream side to the second chamber on the upstream side is provided at a position in which the ink supply opening is horizontally displaced from the ink discharge opening and faces an upper surface of the filter from above.

Meanwhile, in the printer described above, foreign matters or air bubbles which are collected, by the filter, from the liquid flowing into the second chamber of the filter chamber, which is located on the upstream side, are adhered to an inner portion of the filter or to a surface (an upper surface of the filter which is horizontally disposed, in JP-A-2012-45725) of the filter, which faces the upstream side.

Thus, when the ink supply opening through which the liquid flows to the second chamber faces a surface of the filter, which is located on the second chamber side, the foreign matters or the likes which are collected by and adhered to the filter are pushed by, for example, the liquid which flows from the upstream side to the second chamber of the filter chamber through the ink supply opening during a printing operation, and thus the foreign matters or the likes may pass through the filter to the downstream side. As a result, the foreign matters or the likes which unexpectedly pass through the filter flow from the first chamber on the downstream side to the liquid ejecting head and this results in, for example, clogging of the nozzles. Accordingly, there is a possibility that ejection properties of the ink may be deteriorated.

When the foreign matters or air bubbles which are collected by and adhered to the filter unexpectedly pass through the filter and flow to the first chamber on the downstream side, particularly, the air bubbles normally remain in an upper portion (a portion directly below the filter, in JP-A-2012-45725) of the first chamber. Thus, when the ink discharge opening through which the ink flows from the first chamber to the liquid ejecting head side is provided in a lower portion of the first chamber, there is a possibility that the air bubbles remaining in the upper portion of the first chamber may not be discharged even when negative pressure is applied, from the downstream side, to the filter chamber to perform maintenance of the liquid ejecting head. As a result, discharging properties of the air bubbles through the liquid supply path are deteriorated, and thus a supplied amount of the ink cannot be sufficiently ensured. Therefore, there is a possibility that ejection properties of the ink may be deteriorated.

SUMMARY

An advantage of some aspects of the invention is to provide a liquid ejecting apparatus in which deterioration in ejection properties of liquid through a liquid ejecting head can be reduced in such a manner that foreign matters or air bubbles which are collected by a filter which is disposed in a liquid supply path and filters liquid are prevented from unexpectedly passing through the filter to a downstream side and discharging properties of air bubbles in a maintenance operation are prevented from deteriorating.

Hereinafter, means of the invention and operation effects thereof will be described.

According to an aspect of the invention, there is provided a liquid ejecting apparatus that includes a liquid ejecting head having nozzles through which liquid can be ejected, a liquid supply path through which the liquid is supplied to the liquid ejecting head, and a filter chamber which is disposed in the middle of the liquid supply path and of which an inner portion is divided into a first chamber on a downstream side and a second chamber on an upstream side by a filter which filters the liquid, in which a liquid inlet through which the liquid is introduced from an upstream side of the liquid supply path to the second chamber of the filter chamber is formed not to face a surface of the filter, which is located on the second chamber side, and a liquid outlet through which the liquid is introduced from the first chamber of the filter chamber to a downstream side of the liquid supply path is formed in an upper position of the first chamber in a vertical direction.

In this case, when the liquid is introduced through the liquid inlet from the upstream side of the liquid supply path to the second chamber of the filter chamber, a pushing force of the liquid, which pushes foreign matters or air bubbles, which are collected by and adhered to the filter at this time, from the upstream side to the first chamber on the downstream side is suppressed, compared to a case where the liquid inlet faces the surface of the filter, which is located on the second chamber side. In addition, the air bubbles which pass through the filter from the second chamber of the filter chamber to the downstream side and remain in the vicinity of the upper portion of the first chamber can be favorably discharged from the liquid outlet to the downstream side in such a manner that the liquid outlet through which the liquid is introduced from the first chamber to the downstream side of the liquid supply path is provided in an upper portion of the first chamber in a vertical direction. Thus, the foreign matters or the air bubbles which are collected by the filter which is disposed in the liquid supply path and filters the liquid are prevented from unexpectedly passing through the filter to the downstream side. Furthermore, discharging properties of air bubbles in a maintenance operation are prevented from deteriorating. As a result, it is possible to reduce a possibility that ejection properties of the liquid through the liquid ejecting head may be deteriorated.

In the liquid ejecting apparatus described above, it is preferable that the filter be disposed in the filter chamber to have a height difference.

In this case, even when the air bubbles contained in the filtered ink are collected by and adhered to the filter, the air bubbles are likely to be collected in the upper portion of the filter and it is difficult for the air bubbles to be collected in the lower portion. Thus, a possibility that the lower portion of the filter having a height difference may be closed by the air bubbles adhered thereto can be reduced, and thus it is possible to ensure flowing properties of the liquid, which is subject to filtration, to the downstream side.

In the liquid ejecting apparatus described above, it is preferable that at least a part of wall surfaces of the second chamber of the filter chamber be constituted by a flexible member.

In this case, when a negative pressure application portion applies negative pressure to the liquid supply path, the flexible member is bent to the inner portion of the second chamber. This promotes a process such that the liquid passes through the filter and flows to the downstream side, and thus it is possible to improve discharging properties of the air bubbles, which are adhered to the filter, to the downstream side.

In the liquid ejecting apparatus described above, it is preferable that the flexible member be a thin film member which is disposed to face the filter.

In this case, when the flexible member constituted by a thin film is bent to the inner portion of the second chamber, by the negative pressure applied from the negative pressure application portion, the air bubbles which are adhered to the surface of the filter, which is located on the second chamber side, can pass through the filter and flow to the first chamber in such a manner that the bent flexible member constituted by the thin film pushes the air bubbles to the downstream side.

In the liquid ejecting apparatus described above, it is preferable that a regulation member which regulates deformation of the flexible member in a direction in which a volume of the second chamber increases be provided outside the second chamber.

In this case, the flexible member can be protected using the regulation member. In addition, in a case where, for example, the filter chamber is detachable by unit, when a filter chamber unit is removed, it is possible to reduce an amount of ink which can leak out, through the liquid inlet, from the second chamber of the filter chamber.

In the liquid ejecting apparatus described above, it is preferable that, when the filter is set to an upstream filter and the filter chamber is set to an upstream filter chamber, a downstream filter chamber be provided further on a downstream side than the upstream filter chamber of the liquid supply path such that, when the liquid is filtered, an effective area of the upstream filter is set to be greater than an effective area of the downstream filter which is accommodated in the downstream filter chamber.

In this case, the liquid which flows from the upstream side of the liquid supply path to the liquid ejecting head on the downstream side flows to the upstream filter chamber, and then is filtered by the upstream filter. Therefore, foreign matters or the likes are collected by and adhered to the upstream filter. Thus, compared to the case of the downstream filter, there is a high possibility that clogging may occur in the upstream filter because the upstream filter is closed by, for example, the collected foreign matters. However, from the viewpoint of this problem, the effective area of the upstream filter is larger than that of the downstream filter, and thus it is possible to reduce such a possibility.

The liquid ejecting apparatus described above may further include a pressure adjustment valve which is disposed between the upstream filter chamber and the downstream filter chamber of the liquid supply path and performs an opening/closing operation in accordance with pressure fluctuation on the downstream side and a pressure portion which is disposed further on the upstream side of the liquid supply path than the upstream filter chamber and supplies the liquid to the downstream side in a pressurized manner.

In this case, in a case where a pressure portion pressurizes the liquid to supply the liquid from the upstream side of the liquid supply path to the liquid ejecting head on the downstream side, even when the wall surface of the second chamber of the upstream filter chamber is constituted by, for example, the flexible member, the flexible member is bent outward, and thus the volume of the second chamber increases. As a result, the flexible member is prevented from being in contact with the filter in an inner side and hindering the flow of the liquid.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of an ink jet type printer, as an example of a liquid ejecting apparatus, in which a liquid ejecting head ejects ink as an example of liquid on a paper sheet or the like so as to print an image including letters, figures, and the like will be described with reference to the accompanying drawings.

Figure 1:
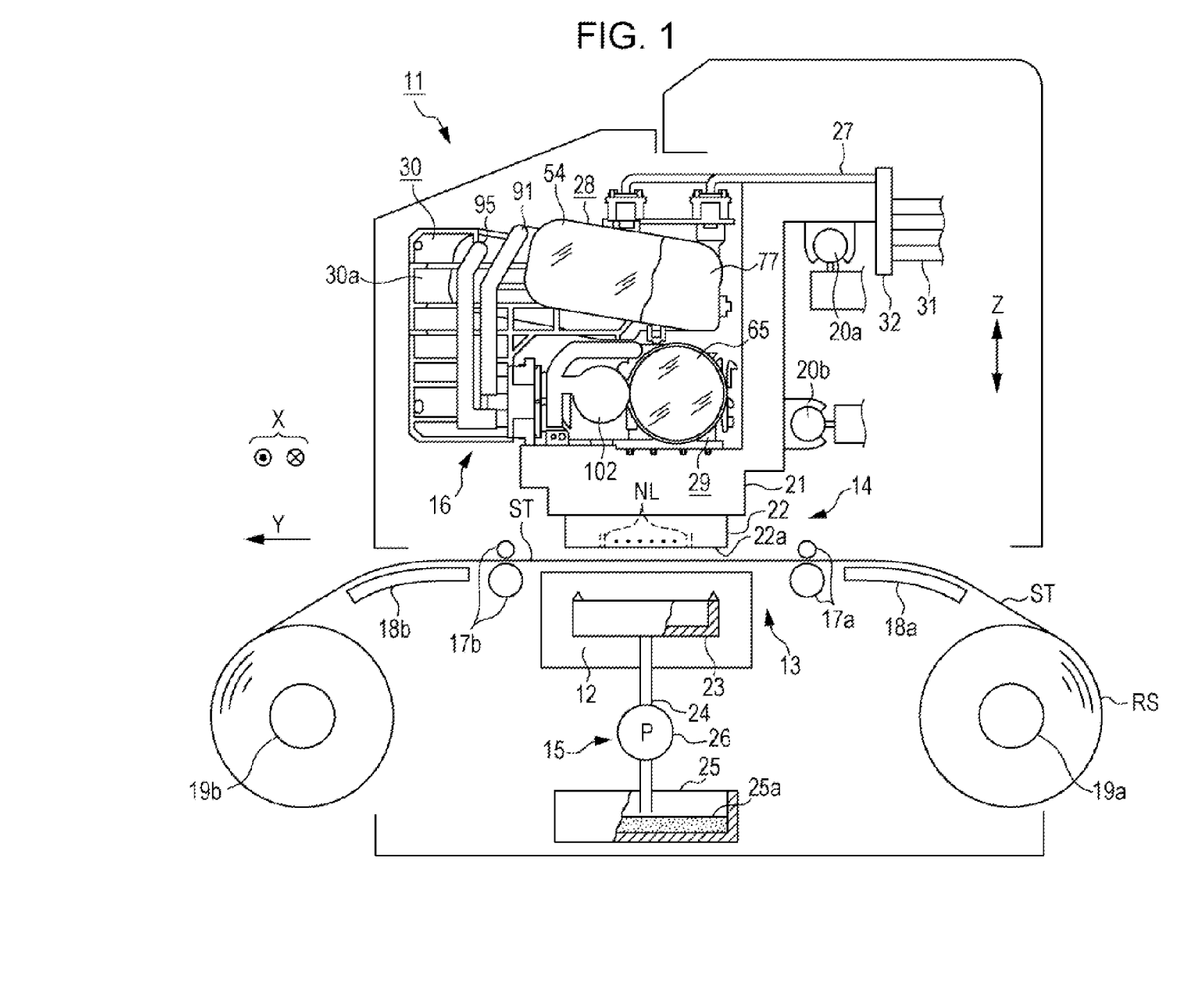
FIG. 1 is a schematic configurational view of a printer of an embodiment.

A printer 11 includes a transport portion 13 which transports a paper sheet ST to move along a surface of a support table 12, a liquid ejecting portion 14 which ejects ink onto the paper sheet ST that is transported over the support table 12, a maintenance portion 15 which performs maintenance of the liquid ejecting portion 14, and a liquid supply portion 16 which filters and temporarily stores the ink, and then supplies the ink to the liquid ejecting portion 14, as illustrated in FIG. 1. In the printer 11, the support table 12 extends in a width direction (a direction perpendicular to the paper sheet of FIG. 1) of the paper sheet ST.

The transport portion 13 has a pair of transport rollers 17a and 17b of which one roller is driven by a driving source (not illustrated). The pair of rollers rotates while pinching the paper sheet ST, and thus the paper sheet ST is transported along the surface of the support table 12 and surfaces of guide plates 18a and 18b which are provided on an upstream side and a downstream side of the support table 12 in a transporting direction Y. In the embodiment, the paper sheet ST is fed from a rolled body RS which is wound, in a rolled shape, around a supply reel 19a, and thus the paper sheet ST is transported, in a continuous paper shape, to the downstream side. An image is printed on the transported paper sheet ST in such a manner that the ink ejected from the liquid ejecting portion 14 is adhered to the paper sheet ST, and then the paper sheet ST is wound again in a rolled shape by a winding reel 19b.

The liquid ejecting portion 14 includes a carriage 21 which slides, in a contact manner, on guide shafts 20a and 20b that extend in a scanning direction X, that is, in the width direction of the paper sheet ST which intersects the transporting direction Y of the transported paper sheet ST and which can be reciprocated by a driving source (not illustrated). A liquid ejecting head 22 which ejects the ink is installed in the carriage 21. Furthermore, the liquid ejecting head 22 is installed in a lower side of the carriage 21, which is a gravity direction side in a vertical direction Z, such that a nozzle formed surface 22a having nozzles NL, through which the ink is ejected, is formed thereon to face the surface of the support table 12.

The maintenance portion 15 includes a cap 23 which is provided at a position outside (a front side in FIG. 1) of the support table 12 in the scanning direction X and is movable in the vertical direction Z, a discarded ink tank 25 which recovers the discarded ink that is discharged from the cap 23 through the tube 24, and a tube pump 26 which is driven when the discarded ink is discharged from the cap 23 to the discarded ink tank 25. A discarded ink absorbing material 25a is accommodated in the discarded ink tank 25.

Meanwhile, the cap 23 is raised in a maintenance operation in which the liquid ejecting head 22 and the carriage 21 are moved and stopped above the cap 23, and then the cap 23 abuts on the nozzle formed surface 22a so as to surround the nozzles NL. In this state, a tube pump 26 as a negative pressure application portion is driven to apply negative pressure through the nozzles NL to an inner portion of the liquid ejecting head 22, and thus the ink which is fluid containing air bubbles or the like is discharged, as discarded ink, through the nozzles NL of the liquid ejecting head 22.

The liquid supply portion 16 includes a filter portion 28 which is connected to a downstream side of a connection tube 27 which is a part of the liquid supply path through which the ink supplied to the liquid ejecting head 22 flows, a storing portion 29 which is connected to a downstream side of the filter portion 28, and a flow path forming body 30 which has a plate shape and forms, as a part of the liquid supply path, a flow path connecting the filter portion 28 and the storing portion 29. In other words, the ink which flows from the upstream side via the connection tube 27 into the filter portion 28 is filtered in the filter portion 28, and then the ink is temporarily stored in the storing portion 29. Subsequently, the ink is supplied to the liquid ejecting head 22 on the downstream side. In addition, the filter portion 28 is provided on an upper portion of the flow path forming body 30 which is supported on the carriage 21 via the storing portion 29. An upstream end of the connection tube 27 is connected via a connection adapter 32 to a downstream end of an ink supply tube 31 which is a part of the liquid supply path and is deformable following the reciprocation of the carriage 21.

Next, an ink supply system 40 which supplies the ink to the liquid ejecting head 22 will be described with reference to FIG. 2.

Figure 2:
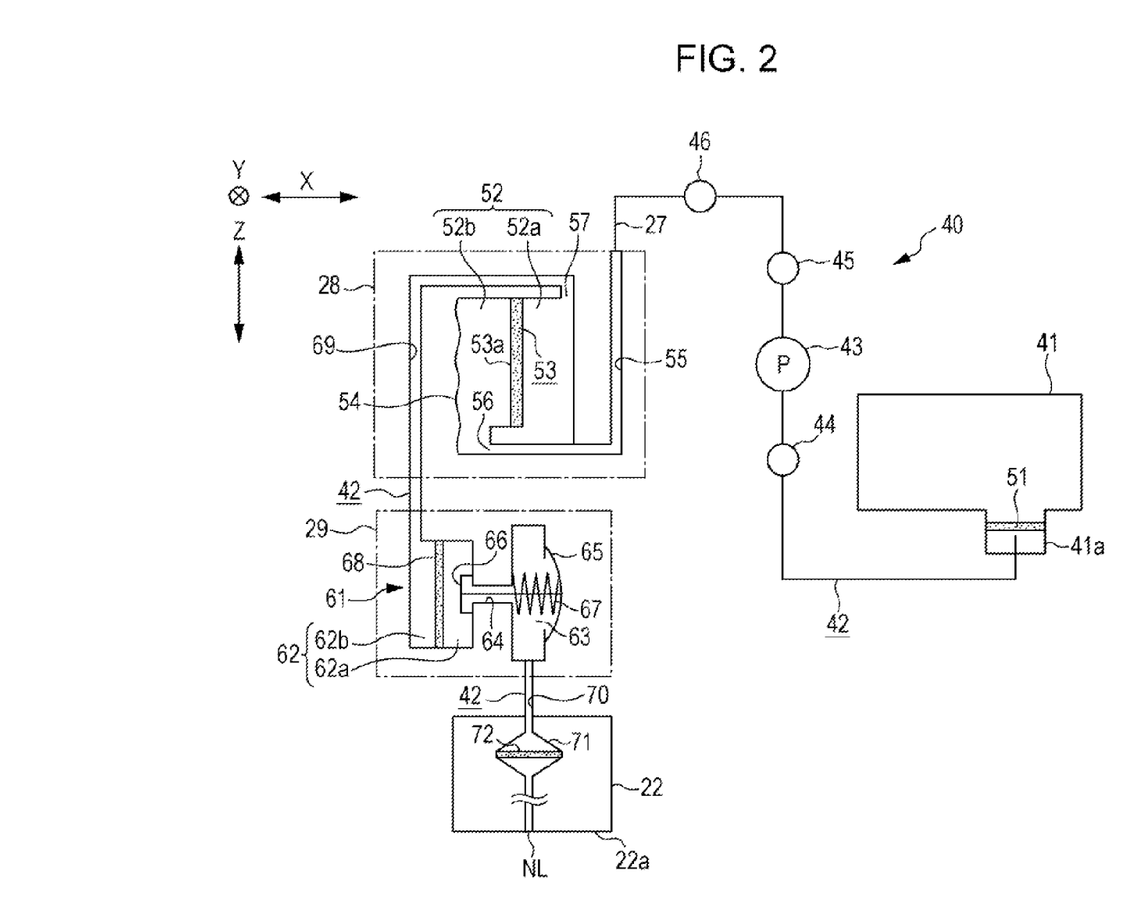
FIG. 2 is a schematic configurational view of an ink supply system which supplies ink to a liquid ejecting head.

The ink supply system 40 includes an ink cartridge 41 in which the ink is accommodated and a liquid supply path 42 which connects the ink cartridge 41 and the liquid ejecting head 22, as illustrated in FIG. 2. In the middle of the liquid supply path 42, the filter portion 28 and the storing portion 29 are arranged in series such that the storing portion 29 is located further on the downstream side than the filter portion 28. Furthermore, in the liquid supply path 42, a flow path pump 43 which is an example of a pressure portion and pressurizes the ink in a pumping manner when the ink is supplied from the ink cartridge 41 side to the liquid ejecting head 22 side is disposed further on the upstream side than the filter portion 28.

The flow path pump 43 is constituted by a diaphragm pump in which, for example, a diaphragm which constitutes a part of a wall surface of the pump chamber is deformed to change a volume of the pump chamber so as to repeat an operation for the ink sucking of a pump chamber and an operation for discharging the ink from the pump chamber one after another. A check valve 44 is provided on the upstream side of the flow path pump 43 and a check valve 45 is provided on the downstream side of the flow path pump 43. Therefore, when the flow path pump 43 performs a pumping operation, the ink is prevented from flowing in a reverse direction, that is, flowing to the upstream side further than the check valve 44 or 45 and flowing to the downstream side further than the check valve 44 or 45 are allowed.

In the liquid supply path 42, a choke valve 46 is provided between the filter portion 28 and the check valve 45. In a case where maintenance of the liquid ejecting head 22 is performed, when negative pressure is applied to a part of the liquid supply path 42, which corresponds to a path from the nozzles NZ to the choke valve 46 by an operation of the tube pump 26, the choke valve 46 is closed. In a state where the choke valve 46 is closed, when the ink is pressurized by a pumping operation of the flow path pump 43 and supplied from the upstream side, the choke valve 46 is opened. Thus, the ink instantly flows from the upstream side of the choke valve 46 to the liquid ejecting head 22 on the downstream side.

In the embodiment, the ink supply systems 40 configured as above are provided by as many as the number of types of ink which are used for printing in the printer 11. When there are four types of ink to be used, for example, four ink cartridges 41 in which different types of ink are respectively accommodated are mounted to a cartridge holder (not illustrated). The ink is supplied to the nozzles NL having four nozzle arrays, which are provided on the liquid ejecting head 22, through four liquid supply paths 42 which are respectively connected to the ink cartridges 41. In the supply process, the ink is filtered by the filter portion 28 and the like.

Next, the filtration configuration of ink during the process in which the ink is supplied from the ink cartridge 41 to the liquid ejecting head 22 through the ink supply system 40 will be described.

In the ink cartridge 41, a filter 51 embedded in cartridge is disposed in an ink supply port 41a to which an upstream end (for example, an ink supply needle) of the liquid supply path 42 is connected, as illustrated in FIG. 2. The filter 51 in cartridge is a woven mesh filter capable of collecting foreign matters equal to or larger than 10 µm. The filter 51 in cartridge is provided in the ink supply port 41a of the ink cartridge 41, and thus it is possible to significantly extend the lifespan of a fixed-type filter disposed in the middle of the liquid supply path 42 in the printer 11.

In addition, a filter chamber 52 having a predetermined volume is provided in the filter portion 28 and a filter 53 having a plate shape is provided in the filter chamber 52 so as to extend along the vertical direction Z, that is, to have a height difference. An inner portion of the filter chamber 52 is divided into a first chamber 52a on the downstream side and a second chamber 52b on the upstream side by the filter 53 which is disposed in a longitudinal direction as described above. Similarly to the filter 51 in cartridge, the filter 53 is also constituted by a woven mesh filter capable of collecting foreign matters equal to or larger than 10 µm.

A part of wall surfaces of the second chamber 52b which is located further on the upstream side in the filter chamber 52 than the filter 53 is constituted by a film member 54, which is constituted by a thin film, as an example of a flexible member. Specifically, in the wall surfaces of the second chamber 52b, the wall surface facing a surface 53a of the filter 53, which is located on the second chamber 52b side, is constituted by the film member 54. As a result, the film member 54 is flexibly deformed such that the volume of an inner portion of the second chamber 52b of the filter chamber 52 can be changed. The second chamber 52b and the connection tube 27 of the liquid supply path 42 are connected by an ink flow path 55 which is formed, in the flow path forming body 30, as a part of the liquid supply path 42.

A downstream end of the ink flow path 55 constitutes a liquid inlet 56 through which the ink is introduced from the upstream side of the liquid supply path 42 to the second chamber 52b of the filter chamber 52. The liquid inlet 56 is designed such that a direction of an opening which regulates a flowing direction of the ink from the liquid inlet 56 to the second chamber 52b is set not to face the surface 53a of the filter 53, which is located on the second chamber 52b side. In other words, in the embodiment, the liquid inlet 56 is provided such that the direction of the opening is set to be parallel to the surface 53a of the filter 53, which is located on the second chamber 52b side, or is set to face the film member 54 which constitutes a part of the wall surfaces of the second chamber 52b.

The liquid inlet 56 is opened at a lower position in the second chamber 52b, for example, at the lowermost position. This is because, when the ink contains components likely to be settled, settling of the components is prevented by stirring the components settled in a bottom portion of the second chamber 52b, using the ink flow introduced from the liquid inlet 56 to the second chamber 52b. Meanwhile, a liquid outlet 57 through which the ink is introduced from the first chamber 52a of the filter chamber 52, which is located on the downstream side, to the downstream side of the liquid supply path 42 is opened at an upper position in the first chamber 52a, for example, in the vicinity of the uppermost portion. The reason for this will be described in the following. The air bubbles which pass through the filter 53, which filters the ink, from the second chamber 52b side to the first chamber 52a side and stay in the first chamber 52a are remain at an upper position in the vertical direction Z under the influence of gravity. Thus, such air bubbles remaining at the upper position are easily introduced to the downstream side.

A pressure adjustment valve 61 is provided in the storing portion 29 which is disposed, in the middle of the liquid supply path 42, between the liquid ejecting head 22 and the filter portion 28, as illustrated in FIG. 2. The pressure adjustment valve 61 includes an ink storing chamber 62, a pressure chamber 63, a communication hole 64 which allows both chambers 62 and 63 to communicate with each other, a film member 65 which has flexibility and constitutes a part of wall surfaces of the pressure chamber 63, a valve body 66 of which a base end of a shaft portion is connected to an inner surface of the film member 65 and a tip end is located in the ink storing chamber 62, and a biasing spring 67 which biases the film member 65 to the atmosphere side.

A filter 68 having a plate shape is disposed in the ink storing chamber 62 so as to extend in the vertical direction Z. An inner portion of the ink storing chamber 62 is divided into a downstream storing chamber 62a and an upstream storing chamber 62b by the filter 68 which is disposed in a longitudinal direction as described above. Under consideration of flow resistance of the filter 68 and the size of foreign matter which may hinder an opening/closing operation of the valve body 66, the filter 68 is constituted by a woven mesh filter which can collect foreign matter equal to or larger than 20 μm and of which the mesh is larger than that of the filter 53 of the filter portion 28 on the upstream side.

The upstream storing chamber 62b is connected to the outlet 57 of the filter chamber 52 through the ink flow path 69 which is formed, in the flow path forming body 30, as a part of the liquid supply path 42. When the valve body 66 is opened, the downstream storing chamber 62a supplies the ink, which passes through the filter 68 and flows from the upstream storing chamber 62b, to the pressure chamber 63 side through the communication hole 64. When the pressure in the pressure chamber 63 is changed to negative pressure owing to ejection of the ink from the liquid ejecting head 22, and thus the film member 65 having flexibility is flexibly deformed, against the biasing force of the biasing spring 67, to the inner surface side of the pressure chamber 63, the valve body is displaced, along with the film member 65, to the ink storing chamber 62 side such that the valve body 66 is opened.

An ink flow path 70 which is a part of the liquid supply path 42 and connects the pressure chamber 63 of the pressure adjustment valve 61 and the nozzles NL of the liquid ejecting head 22 is formed in the inner portion of the liquid ejecting head 22, as illustrated in FIG. 2. A filter chamber 71 is provided in the middle of the ink flow path 70. When the filter chamber 52 of the filter portion 28 is set to an upstream filter chamber, the filter chamber 71 functions as a downstream filter chamber which is located further on the downstream side in the liquid supply path 42 than the upstream filter chamber. A filter 72 having a plate shape is accommodated in an inner portion of the filter chamber 71 so as to extend in a horizontal direction. In other words, when the filter 53 of the filter portion 28 is set to an upstream filter, the filter 72 functions as a downstream filter which is located further on the downstream side in the liquid supply path 42 than the upstream filter. The filter 72 partitions the filter chamber 71 in the vertical direction. Similarly to the filter 53 of the filter portion 28, the filter 72 is also constituted by a woven mesh filter capable of collecting foreign matter equal to or larger than 10 μm.

Next, a specific configuration of the liquid supply portion 16 will be described with reference to the accompanying drawings. For convenience of description, in FIGS. 3 and 4, film members and thin film members which are adhered to the filter portion 28, the storing portion 29, and the flow path forming body 30 to form a filter chamber, an ink flow path, and the like are not illustrated.

Figure 3:
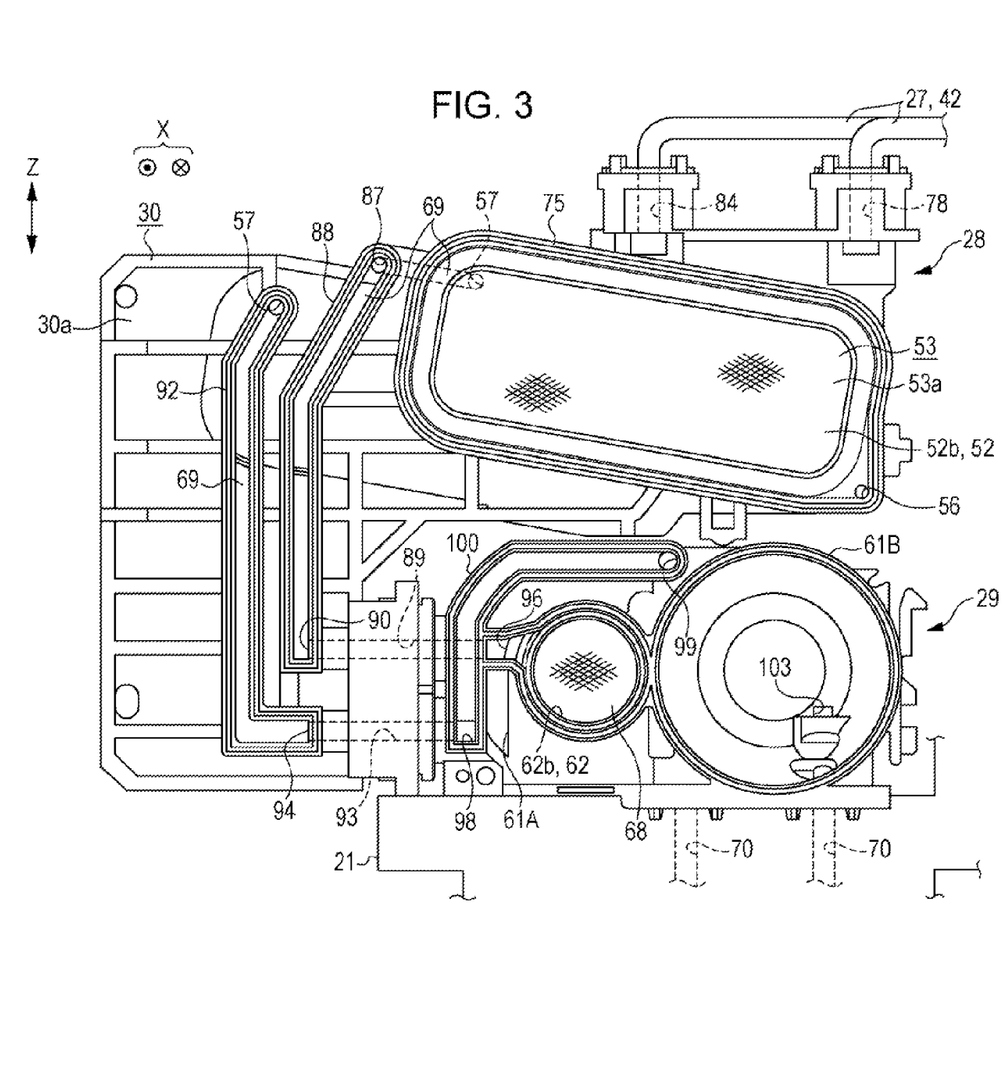
FIG. 3 is a front view of a liquid supply portion which filters and temporarily stores ink.
Figure 4:
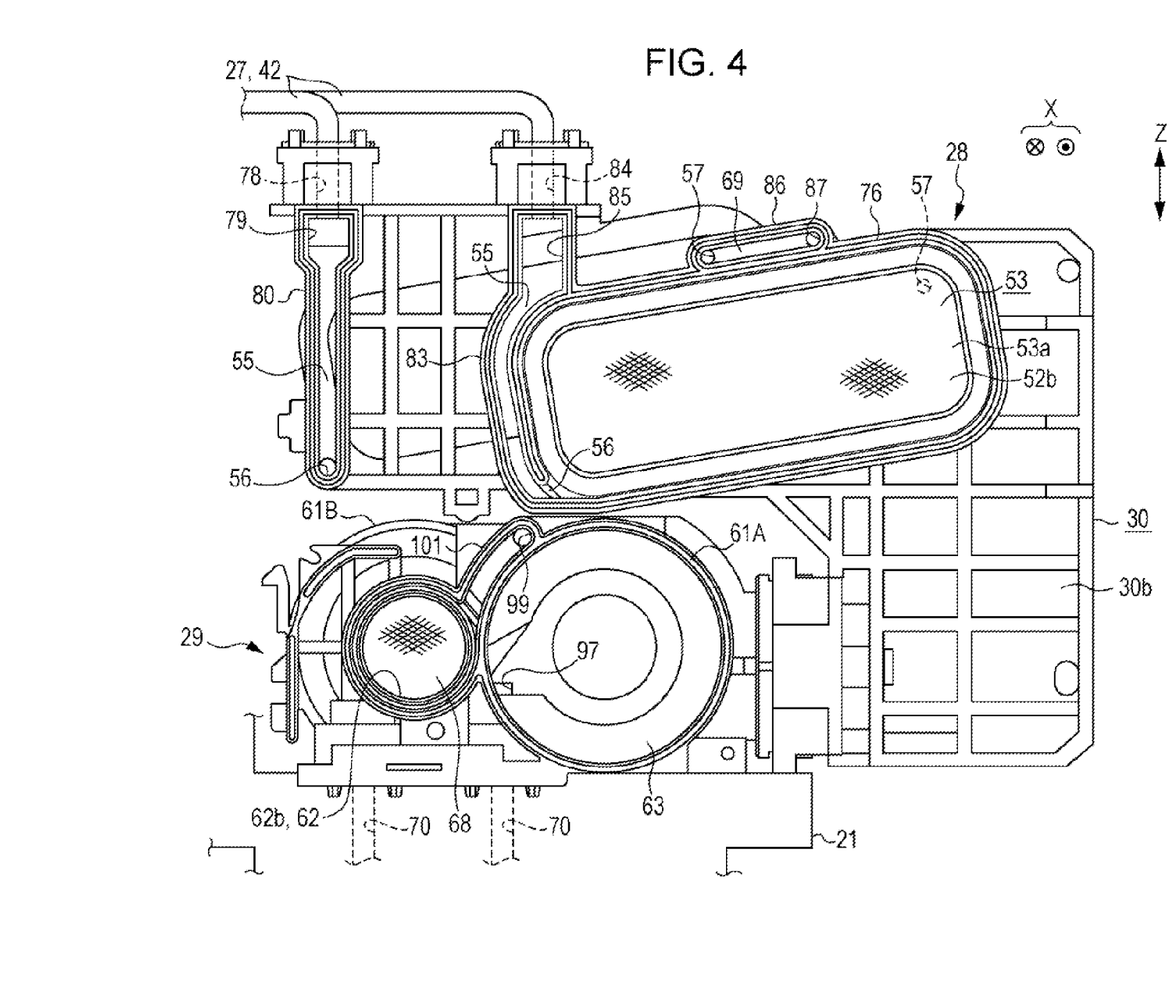
FIG. 4 is a rear view of the liquid supply portion.

The flow path forming body 30 having a plate shape is installed on the carriage 21 such that a plate thickness direction thereof is parallel to the scanning direction X, that is, a movement direction of the carriage 21, as illustrated in FIGS. 3 and 4. In a state where the flow path forming body 30 is installed as described above, in an area corresponding to the substantially upper half of the flow path forming body 30 in the vertical direction Z, annular walls 75 and 76 having a substantially rectangular shape protrude to the one side and the other side in the scanning direction X. The annular walls 75 and 76 which are provided on the one side (a front side of the paper sheet in FIG. 3 and a back side of the paper sheet in FIG. 4) and the other side in the scanning direction X are paired. A pair of both annular walls 75 and 76 are obliquely disposed such that one end sides thereof in the longitudinal direction (a left end side in FIG. 3 and a right end side in FIG. 4) are located upper than the other end sides. In addition, the pair of both annular walls 75 and 76 are formed such that horizontal positions thereof are misaligned by substantially half the length of the annular wall in the longitudinal direction. The film members 54 are adhered to edges of the respective annular walls 75 and 76, as illustrated in FIG. 1, and thus the filter chambers 52 capable of storing the ink are formed inside the respective annular walls 75 and 76.

Either one of the annular wall (hereinafter, also referred to as "a first annular wall") 75 illustrated in FIG. 3 or the annular wall (hereinafter, also referred to as "a second annular wall") 76 illustrated in FIG. 4 forms one filter chamber 52 in one ink supply system 40 illustrated in FIG. 2. In other words, a pair of the annular walls 75 and 76 which form the respective filter chambers 52 of two ink supply systems 40 are formed in one flow path forming body 30. Therefore, when the number of types of ink used for the printer 11 is four, four ink supply systems 40 are mounted. Accordingly, two flow path forming bodies 30 are installed on the carriage 21, and thus, in total, four filter chambers 52 are formed using two first annular walls 75 and two second annular walls 76.

In the flow path forming body 30, in a corner portion (a corner portion on a lower right side in FIG. 3) which is the lowermost portion in the first annular wall 75, the liquid inlet 56 through which the ink is introduced from the upstream side of the liquid supply path 42 to the filter chamber 52 (the second chamber 52b) are formed in a penetrated manner, as illustrated in FIGS. 3 and 4. In other words, the liquid inlet 56 is formed in the corner portion of the lowermost portion in which settled components in the ink are most likely to be collected because the first annular wall 75 having a substantially rectangular shape is obliquely disposed.

Furthermore, in the flow path forming body 30, in the vicinity of a corner portion (a corner portion on an upper left side in FIG. 3) which is the uppermost portion in the first annular wall 75, a liquid outlet 57 through which the ink is introduced from the filter chamber 52 (the first chamber 52a) to the downstream side of the liquid supply path 42 is formed in a penetrated manner. In other words, the liquid outlet 57 is formed in the vicinity of the corner portion of the uppermost portion in which air bubbles separated from the ink are most likely to be collected because the first annular wall 75 having a substantially rectangular shape is obliquely disposed.

The filter 53 which has a plate shape and is formed in a substantially rectangular shape slightly smaller than the first annular wall 75 is provided in an inner side of the first annular wall 75 so as to extend along the vertical direction Z. The filter 53 is located at a position in which, when seen from the scanning direction X, the filter 53 does not overlap an opening of the liquid inlet 56 in the corner portion of the lower right side and overlaps the liquid outlet 57 in the vicinity of the corner portion of the upper left side. Therefore, when the film member 54 is adhered to the edge of the first annular wall 75, as illustrated in FIG. 1, the second chamber 52b which communicates with the liquid inlet 56 is formed, in a surrounded manner, by the film member 54, the first annular wall 75, and the filter 53. In the embodiment, an area of the opening of the liquid inlet 56 is $1.3 \times 10^{-6}$ m$^2$, an area of the film member 54 which is an inner wall of the second chamber 52b is $700 \times 10^{-6}$ m$^2$, and an effective area of the filter 53 is $440 \times 10^{-6}$ m$^2$.

As an example of a regulation member which prevents the film member 54 from being flexibly deformed in a direction in which the volume of the second chamber 52b increases, a protection member 77 which has a plate shape and is constituted by, for example, plated steel, stainless steel, aluminum having non-flexibility is provided on an external side of the film member 54 to cover the film member 54, as illustrated in FIG. 1. Although the protection member 77 is a member having the substantially same shape as the film member 54, for convenience of illustration in the drawing, a part of the protection member 77 is removed in FIG. 1.

An opening 79 which is a downstream end of a communication path 78 communicating with the connection tube 27 of the liquid supply path 42 is formed on a side surface 30b of the other side (on a front side of the paper sheet in FIG. 4) of the flow path forming body 30, at a position in which the opening 79 is separated linearly upward from the opening of the liquid inlet 56 which is formed to pass through a portion between the other side surface 30b and one side surface 30a, as illustrated in FIG. 4. In addition, a vertically-long annular rib 80 in which the opening 79 is located on an inner edge of one end side in the longitudinal direction and the opening of the liquid inlet 56 is located on an inner edge of the other end side is provided on the side surface 30b of the flow path forming body 30, which is on the other side, so as to protrude toward the other side (the front side of the paper sheet in FIG. 4). A thin film member (not illustrated) having the substantially same shape as the annular rib 80 is adhered to the edge of the annular rib 80, and thus an ink flow path 55 through which the ink supplied from the upstream side of the liquid supply path 42 flows to the liquid inlet 56 side is formed on an inner side of the annular rib 80.

A second annular wall 76 which has a substantially rectangular shape similar to the first annular wall 75 protruding on the one side surface 30a but has slight differences in that some parts protrudes on the side surface 30b of the flow path forming body 30, which is on the other side, in an area which is located further on the inner side of the flow path forming body 30 in a horizontal direction than the position in which the annular rib 80 is formed, as illustrated in FIG. 4. In other words, in the second annular wall 76, the liquid inlet 56 through which the ink is introduced from the upstream side of the liquid supply path 42 to the filter chamber 52 (the second chamber 52b) is formed in the corner portion (the corner portion of the lower left side in FIG. 4) which is the lowermost portion. The liquid inlet 56 is formed not by forming a through-hole on the flow path forming body 30 but by cutting out a part of the annular wall in a gullet shape. In addition, in the flow path forming body 30, the liquid outlet 57 through which the ink is introduced from the filter chamber 52 (the first chamber 52a) to the downstream side of the liquid supply path 42 is formed in the vicinity of the corner portion (the corner portion of the upper right side in FIG. 4) which is the uppermost portion in the inner side of the second annular wall 76.

The filter 53 which has a plate shape and is formed in a substantially rectangular shape slightly smaller than the second annular wall 76 is provided in an inner side of the second annular wall 76 so as to extend along the vertical direction Z. The filter 53 is located at a position in which, when seen from the scanning direction X, the filter 53 does not overlap the liquid inlet 56 in the corner portion of the lower left side and overlaps the liquid outlet 57 in the vicinity of the corner portion of the upper right side. Therefore, when the film member 54 is adhered to the edge of the second annular wall 76, similar to the case of the first annular wall 75 of the side surface 30a on the one side, the second chamber 52b which communicates with the liquid inlet 56 is formed, in a surrounded manner, by the film member 54, the second annular wall 76, and the filter 53. Similarly to the case of the first annular wall 75, the protection member 77 which is an example of a regulation member and has non-flexibility is also provided on an external side of the film member 54 which is adhered to the edge of the second annular wall 76 to cover the film member 54.

In the side surface 30b of the flow path forming body 30, which is on the other side, a vertically-long annular rib 83 which extends in the vertical direction is formed using a part of a short side portion of the second annular wall 76 so as to protrude, toward the other side, on an external side of the short side portion of the second annular wall 76 in which the liquid inlet 56 is formed in a gullet shape in a notched manner, as illustrated in FIG. 4. The liquid inlet 56 having a gullet shape is formed on an inner edge of the annular rib 83, which is located on a lower end side. The opening 85 which is a downstream end of the communication path 84 and communicates with the connection tube 27 of the liquid supply path 42 is formed on an inner edge of the annular rib 83, which is located on the upper end side. A film member (not illustrated) having the substantially same shape as the annular rib 80 is adhered to the edge of the annular rib 83, and thus the ink flow path 55 through which the ink supplied from the upstream side of the liquid supply path 42 flows to the liquid inlet 56 side is formed on an inner side of the annular rib 83.

In the side surface 30b of the flow path forming body 30, which is located on the other side, an annular rib 86 which extends obliquely is formed using a part of a long side portion of the second annular wall 76 so as to protrude, toward the other side, on an external side of the long side portion of the second annular wall 76, which is located on the upper side. The liquid outlet 57 is formed on an inner edge of the annular rib 86, which is located on a lower end side in an oblique direction. A through-hole 87 which extends to the side surface 30a of the flow path forming body 30, which is located on the one side, is formed on the inner edge on an upper end side thereof. A thin film member (not illustrated) having substantially the same shape as the annular rib 86 is adhered to the edge of the annular rib 86, and thus an ink flow path 69 through which the ink introduced through the liquid outlet 57 from the first chamber 52a of the filter chamber 52 flows from the through-hole 87 to the downstream side of the liquid supply path 42 is formed on an inner side of the annular rib 86.

In the side surface 30a of the flow path forming body 30, which is located on the one side, a vertically-long annular rib 88 which extends in the vertical direction and of which the through-hole 87 is located on the inner edge on the upper end side, is formed in an area extending downward from a position in which the through-hole 87 from the other side surface 30b side is formed so as to protrude toward the one side, as illustrated in FIG. 3. An opening 90 which is an upstream end of a communication path 89 communicating with the ink storing chamber 62 of the pressure adjustment valve 61 is formed on an inner edge of the annular rib 88, which is located on the lower end side. A thin film member 91 is adhered to the edge of the annular rib 88, as illustrated in FIG. 1, and thus the ink flow path 69 which is a part of the liquid supply path 42 is formed on an inner side of the annular rib 88.

In the side surface 30a of the flow path forming body 30, which is located on the one side, a vertically-long annular rib 92 which extends in the vertical direction, similarly to the annular rib 88, is formed in an area which is located on a side in which the annular rib 92 is separated, in the horizontal direction, from the first annular wall 75 more than a position in which the annular rib 88 is formed so as to protrude toward the one side. In the annular rib 92, the liquid outlet 57 which penetrates from the side surface 30b on the other side is located on an inner edge on the upper end side. Furthermore, in the annular rib 92, an opening 94 which is an upstream end of a communication path 93 in communication with the ink storing chamber 62 of the pressure adjustment valve 61 is formed on an inner edge on the lower end side thereof. A thin film member 95 is adhered to the edge of the annular rib 92, as illustrated in FIG. 1, and thus the ink flow path 69 which is a part of the liquid supply path 42 is formed on an inner side of the annular rib 88.

The communication path 89 constitutes a part of the liquid supply path 42 in the first ink supply system 40 in which the filter chamber 52 is formed using the first annular wall 75. The communication path 93 constitutes a part of the liquid supply path 42 in the second ink supply system 40 in which the filter chamber 52 is formed using the second annular wall 76. Thus, in the storing portion 29, the pressure adjustment valves 61 through which the ink is supplied through the communication path 89 and the communication path 93 which extend to the filter portion 28 side are separated from each other.

In other words, the storing portion 29 has a first pressure adjustment valve 61A (which is located on a left side in FIG. 3 and is located on a right side in FIG. 4) belonging to the first ink supply system 40 in which the filter chamber 52 is formed by the first annular wall 75 and a second pressure adjustment valve 61B (which is located on a right side in FIG. 3 and is located on a left side in FIG. 4) which belongs to the second ink supply system 40 in which the filter chamber 52 is formed by the second annular wall 76, as illustrated in FIGS. 3 and 4. As described above, in the embodiment, the storing portion 29 is installed in the carriage 21 with a product specification in which one storing portion 29 and two ink supply systems 40 form one unit.

In a case of the pressure adjustment valve 61A of the first ink supply system 40, the opening 96 which is the downstream end of the communication path 89 is formed to communicate with the upstream storing chamber 62b of the ink storing chamber 62. Accordingly, the ink which flows from the opening 96 to the upstream storing chamber 62b passes through the filter 68 and flows to the downstream storing chamber 62a (see FIG. 2). Then, the ink is temporarily stored in the chamber. Next, the ink flows to the pressure chamber 63 in accordance with an opening operation of the valve body 66 (see FIG. 2), in which the film member 65 (see FIG. 2) which is adhered to the pressure chamber 63 so as to located on a side, in the scanning direction X, opposite the film member 54 which is adhered to the edge of the first annular wall 75 is bent. Subsequently, the ink is supplied to the liquid ejecting head 22 on the downstream side through the opening 97 which is formed in the pressure chamber 63 so as to communicate with the ink flow path 70 (see FIG. 2) on the liquid ejecting head 22 side.

Meanwhile, in a case of the pressure adjustment valve 61B of the second ink supply system 40, an annular rib 100 in which the opening 98 which is the downstream end of the communication path 93 is located on an inner edge on one side and the through-hole 99 is located on an inner edge on the other side is formed on one side in the scanning direction X, in which the first annular wall 75 is formed, so as to extend along an outer edge of the pressure adjustment valve 61A of the first ink supply system 40. A communication path rib 101 which allows the through-hole 99 on one side to communicate with the upstream storing chamber 62b of the ink storing chamber 62, which is formed on the other side, is formed on the other side in the scanning direction X. A thin film member 102 having a shape of which an outer edge is connected to an edge of the upstream storing chamber 62b of the ink storing chamber 62 is adhered to edges of the annular rib 100 and the communication path rib 101, as illustrated in FIG. 1, and thus the ink flow path 69 is formed.

Thus, the ink which flows to the upstream storing chamber 62b through the ink flow path 69 formed as described above passes through the filter 68, and then flows to the downstream storing chamber 62a (see FIG. 2). The ink is temporarily stored in the chamber. Next, the ink flows to the pressure chamber 63 in accordance with an opening operation of the valve body 66 (see FIG. 2), in which the film member 65 (see FIG. 2) which is adhered to the pressure chamber 63 so as to be located on a side, in the scanning direction X, opposite the film member 54 which is adhered to the edge of the second annular wall 76 is bent. Subsequently, the ink is supplied to the liquid ejecting head 22 on the downstream side through the opening 103 which is formed in the pressure chamber 63 so as to communicate with the ink flow path 70 (see FIG. 2) on the liquid ejecting head 22 side.

The liquid supply path 42 between the filter portion 28 and the storing portion 29 and the liquid supply path 42 between the storing portion 29 and the liquid ejecting head 22, which are illustrated in FIG. 2, include seal members (not illustrated). The filter portion 28 is detachable from the storing portion 29 and the storing portion 29 is detachable from the liquid ejecting head 22.

In other words, when the flow path forming body 30 in which the ink flow path 69 extends from the filter chamber 52 of the filter portion 28 to the downstream side thereof is formed and the pressure adjustment valve 61 of the storing portion 29 are assembled, the ink flow path 69 is connected, through the communication paths 89 and 93, to the ink storing chambers 62 of the pressure adjustment valve 61 from the upstream side, as illustrated in FIG. 3. In addition, when the pressure adjustment valve 61 of the storing portion 29 is assembled in the liquid ejecting head 22 on the carriage 21, the pressure chambers 63 of the pressure adjustment valves 61 are connected to the ink flow paths 70 on the liquid ejecting head 22 side through the ink flow paths which extend from the openings 97 and 103, which are formed in the pressure chamber 63, to the downstream sides.

Here, when the functions of a plurality of filters 53 and 72 which are disposed in the middle (specifically, in the filter chamber 52 and the filter chamber 71) of the liquid supply path 42 are compared, the filters 53 and 72 are same in that, as described above, the filters 53 and 72 are constituted by woven mesh filter capable of collecting foreign matter of which the size is equal to or greater than 10 μm and which is contained in the ink passing through the filters from the upstream side to the downstream side. In addition, the filters 53 and 72 are same in that the minimum width of the mesh opening, which defines the roughness of the mesh, is set to be smaller than the opening diameter of the nozzle NL of the liquid ejecting head 22.

When the minimum width of the mesh opening of the filter 53 of the filter chamber 52 on the upstream side is compared to that of the filter 72 of the filter chamber 71 on the downstream side, the roughness of the mesh of the filter 53 on the upstream side is set to the value in which the minimum width of the filter 53 on the upstream side is equal to or smaller than the minimum width of the filter 72 on the downstream side. Meanwhile, in the embodiment, the minimum widths of the mesh openings of both filters 53 and 72 are the same.

The filter 53 on the upstream side is designed such that the effective area when the ink passes through the filter 53 and is filtered is greater than that of the filter 72 on the downstream side. A meniscus withstanding pressure of the filter 53 on the upstream side is designed as follows, in consideration of the case in which the air bubbles are in contact with the surface 53a of the filter 53, which is located on the second chamber 52b side, and thus the area (the area of the filter, in which the air bubbles are not in contact with the filter) of the filter through which the ink can pass is changed. In other words, the meniscus withstanding pressure of the filter 53 is set to the value in which, even when the area of the filter (the area of the filter, in which the air bubbles are not in contact with the filter) through which the ink can pass is changed to, for example, approximately ¼ of the effective area, the air bubbles collected on the second chamber 52b side of the filter 53 do not pressurize-flow to the downstream side when the ink flows from the upstream side due to a printing operation.

Next, an operation of the printer 11 of the embodiment, which is constituted as described above, will be described.

When the flow path pump 43 supplies the ink accommodated in the ink cartridge 41 to the liquid ejecting head 22, the flow path pump 43 which is provided in the middle of the liquid supply path 42 performs a pumping operation. Accordingly, the ink is sucked from the upstream side to the pump chamber of the flow path pump 43 and the ink is discharged from the pump chamber to the downstream side. Then, the discharged ink is introduced into the filter chamber 52 of the filter portion 28 which is disposed on the downstream side. Specifically, the ink is introduced through the liquid inlet 56 to the second chamber 52b which is located further on the upstream side than the filter 53 in the filter chamber 52.

In this case, when the ink is introduced through the liquid inlet 56 into the second chamber 52b, the ink which flows to the second chamber 52b does not directly flow to the surface 53a of the filter 53, which is located on the second chamber 52b. In other words, in this case, the flow of the ink which flows from the liquid inlet 56 to the second chamber 52b does not directly affect foreign matters adhered to the filter 53. Also, the foreign matters are prevented from being separated from the filter 53 and unexpectedly flowing to the downstream side.

Rather, in this case, the flow of the ink which is introduced from the liquid inlet 56 to the second chamber 52b is directed to an inner surface of the film member 54 which constitutes, on a side opposite the filter 53, a part of the wall surfaces of the second chamber 52b. In other words, in this case, the flow of the ink pushes the film member 54 in a direction in which the film member 54 is separated from the filter 53, and thus prevents the film member 54 from being in contact with the filter 53. Thus, the filter 53 is prevented from being closed by the film member 54, and thus an adequate flow rate of the ink is ensured.

When the ink is introduced from the liquid inlet 56 to the second chamber 52b, the corner portion in which the liquid inlet 56 is formed is the corner portion of the lowermost portion in which settled components in the ink are most likely to be collected. Thus, when the settled components are accumulated in the corner portion, a settled state is eliminated because the ink is stirred by the flow of the introduced ink. In a case of the liquid supply path which extends from the liquid inlet 56 to the second chamber 52b, a cross-sectional area of the liquid supply path is significantly increased at a portion between the liquid inlet 56 and the second chamber 52b, as described above. Therefore, the flow of the ink forms a jet flow, and thus a stirring effect of the ink can be expected.

Subsequently, when, in the filter chamber 52, the ink passes through the filter 53 from the second chamber 52b side to the first chamber 52a side, foreign matters or air bubbles contained in the ink are collected by and adhered to the filter 53. In this case, since the filter 53 is vertically disposed in the filter chamber 52 to have a height difference, the foreign matters, particularly, the air bubbles, which are collected by and adhered to the filter 53 are mainly adhered to an upper portion of the filter 53. Therefore, it is possible to prevent a lower portion of the filter 53 from being closed by the air bubbles adhered thereto.

In this case, the air bubbles remain in the first chamber 52a which is located further on the downstream side than the filter 53 are collected in the vicinity of the uppermost portion in the first chamber 52a (the filter chamber 52). The air bubbles which are collected and remain in the vicinity of the uppermost portion, as described above, are discharged from the liquid outlet 57 which is provided in the vicinity of the uppermost portion of the first chamber 52a to the downstream side. In other words, in a case where the maintenance of the liquid ejecting head 22 is performed, when negative pressure is applied from the downstream side of the liquid supply path 42, the air bubbles are mixed in the ink which is drawn to the downstream side by the negative pressure and are discharged through the liquid outlet 57.

In this case, when negative pressure is applied to the filter chamber 52 from the downstream side, the film member 54 which constitutes a part of the wall surfaces of the second chamber 52b, which faces the filter 53, is deformed to be bent to the inner portion of the second chamber 52b. The ink in the filter chamber 52 flows to the downstream in accordance with the bending deformation, and thus discharge of foreign matters or air bubbles, which are adhered to the filter 53 at this time, to the downstream side is promoted.

In this case, when the bending deformation of the film member 54 to the inner portion of the second chamber 52b is large, the inner surface of which the shape is changed to a convex surface shape by the bending deformation is pressed against the surface 53a of the filter 53, which is located on the second chamber 52b side. Thus, in this case, when foreign matters or air bubbles are adhered to the surface 53a of the filter 53, which is located on the second chamber 52b side, the foreign matters or air bubbles are pushed out by the film member 54 such that the foreign matters or air bubbles pass through the filter 53 from the upstream side to the downstream side. As a result, the foreign matters or the air bubbles are discharged to the downstream side.

Since the film member 54 has flexibility, the film member 54 is deformed to be bent inward when negative pressure is applied to the filter chamber 52 from the downstream side and the film member 54 is deformed to be bent outward when the ink is introduced from the upstream side by pump-driving of the flow path pump 43. However, in this case, when the film member 54 is deformed to be bent outward by an amount greater than a certain degree, the film member 54 abuts on an inner surface of the protection member 77. Thus, the film member 54 is prevented from being bent outward by more than the certain amount. In other words, the film member 54 is prevented from being greatly bent outward and interfering with an external object.

According to the embodiment described above, it is possible to obtain the following effects.

(1) When the ink is introduced through the liquid inlet 56 from the upstream side of the liquid supply path 42 to the second chamber 52b of the filter chamber 52, a pushing force of the ink, which pushes foreign matters or air bubbles, which are collected by and adhered to the filter 53 at this time, from the upstream side to the first chamber 52a on the downstream side is suppressed, compared to a case where the liquid inlet 56 faces the surface 53a of the filter 53, which is located on the second chamber 52b side. In addition, the air bubbles which pass through the filter 53 from the second chamber 52b of the filter chamber 52 to the downstream side and remain in the vicinity of the upper portion of the first chamber 52a can be favorably discharged from the liquid outlet 57 to the downstream side in such a manner that negative pressure which is applied to the liquid supply path 42 by driving the tube pump 26. Thus, foreign matter or air bubbles which are collected by the filter 53 which is disposed in the liquid supply path 42 and filters the ink are prevented from unexpectedly passing through the filter 53 to the downstream side. Furthermore, discharging properties of air bubbles in a maintenance operation is prevented from being deteriorated. As a result, it is possible to reduce a possibility that ejection properties of the ink through the liquid ejecting head 22 may be deteriorated.

(2) Even when the air bubbles contained in the filtered ink is collected by and adhered to the filter 53, the air bubbles are likely to be collected in the upper portion of the filter 53 and it is difficult for the air bubbles to be collected in the lower portion. Thus, a possibility that the lower portion of the filter 53 having a height difference may be closed by the air bubbles adhered thereto can be reduced, and thus it is possible to ensure flowing properties of the ink, which is subject to filtration, to the downstream side.

(3) When the tube pump 26 applies negative pressure to the liquid supply path 42, the film member 54 is bent to the inner portion of the second chamber 52b. This promotes a process such that the ink passes through the filter 53 and flows to the downstream side, and thus it is possible to improve discharging properties of the air bubbles, which are adhered to the filter 53, to the downstream side.

(4) When the film member 54 constituted by a thin film is bent to the inner portion of the second chamber 52b, by the negative pressure applied from the tube pump 26, the air bubbles which are adhered to the surface 53a of the filter 53, which is located on the second chamber 52b side, can pass through the filter 53 and flow to the first chamber 52a in such a manner that the bent film member 54 constituted by the thin film pushing the air bubbles to the downstream side.

(5) The film member 54 can be protected using the protection member 77. In addition, in a case where, for example, the filter chamber 52 is detachable by unit, when a filter chamber unit is removed, it is possible to reduce an amount of ink which can leak out, through the liquid inlet 56, from the second chamber 52b of the filter chamber 52.

(6) The ink which flows from the upstream side of the liquid supply path 42 to the liquid ejecting head 22 on the downstream side flows to the filter chamber 52 on the upstream side, and then is filtered by the upstream filter 53. Therefore, foreign matters or the likes in the ink are collected by and adhered to the upstream filter 53. Thus, compared to the case of the downstream filter 72, there is a higher possibility that clogging may occur in the upstream filter 53 because the upstream filter 53 is closed by, for example, the collected foreign matters. However, when considering this point, the effective area of the upstream filter 53 is larger than that of the downstream filter 72, and thus it is possible to reduce such a possibility.

(7) In a case where the flow path pump 43 pressurizes the ink to supply liquid from the upstream side of the liquid supply path 42 to the liquid ejecting head 22 on the downstream side, even when the wall surface of the second chamber 52b of the filter chamber 52 on the upstream side is constituted by, for example, the film member 54 having flexibility, the film member 54 is bent outward, and thus the volume of the second chamber 52b increases. As a result, the film member 54 is prevented from being in contact with the filter 53 in the chamber and hindering the flow of the ink.

The embodiment described above may be changed as follows.

In the embodiment described above, the flow path pump 43 as a pressure portion may be a reciprocating pump such as a piston pump, other than a diaphragm pump, or may be a rotary pump such as a vane pump.

In the embodiment described above, the filter 68 may not be provided in the ink storing chamber 62 of the pressure adjustment valve 61.

In the embodiment described above, the filter 72 which is provided in the filter chamber 71 in the liquid ejecting head 22 may not be horizontally disposed but may be vertically disposed, along the vertical direction Z, to have a height difference. Furthermore, in this case, when a liquid inlet and a liquid outlet are arranged on the filter chamber 71, similarly to the arrangement of the liquid inlet 56 and the liquid outlet 57 on the filter chamber 52 of the embodiment, the filter chamber 52 on the upstream side may not be provided.

In the embodiment described above, the protection member 77 which covers, from the outer side, the film member 54 of the filter chamber 52 of the filter portion 28 is not limited to a plate shape. The protection member 77 may have a lattice shape or the like or may not be provided.

In the embodiment described above, the film member 54 which constitutes a part of the wall surfaces of the second chamber 52b may not be provided in the filter chamber 52. In other words, in the wall surfaces of the second chamber 52b of the filter 53, the wall surfaces except the filter 53 may be constituted by, for example, non-flexible members.

In the embodiment, the first annular wall 75 and the second annular wall 76 of the filter chamber 52 may not be obliquely disposed. Furthermore, the first annular wall 75 and the second annular wall 76 may have, for example, a circular shape, other than a rectangular shape.

In the embodiment, the liquid inlet 56 through which the ink is introduced into the filter chamber 52 which is constituted by the first annular wall 75 may have a gullet shape, similarly to the liquid inlet 56 through which the ink is introduced into the filter chamber 52 which is constituted by the second annular wall 76. On the contrary, the liquid inlet 56 through which the ink is introduced into the filter chamber 52 which is constituted by the second annular wall 76 may have a through-hole shape, similarly to the liquid inlet 56 through which the ink is introduced into the filter chamber 52 which is constituted by the first annular wall 75.

In the embodiment described above, a negative-pressure portion may be constituted by a suction pump, other than the tube pump 26.

In the embodiment described above, the filter portion 28 and the storing portion 29 may be integrally constituted and the integrated filter portion 28 and storing portion 29 may be detachable from the liquid ejecting head 22. In this case, when replacing the filter portion 28, the pressure adjustment valve 61 in the storing portion 29 functions as a check valve. Thus, it is possible to prevent the ink from leaking out through a connection portion between the liquid ejecting head 22 and the integrated filter portion 28 and storing portion 29.

In the embodiment described above, the liquid ejecting head 22 may not be a type in which the liquid ejecting head 22 is reciprocated by the carriage 21 but may be a so-called line head type in which the liquid ejecting head 22 performs printing on a paper sheet ST in a fixed state.

In the embodiment described above, a supply source of the ink which is liquid ejected from the liquid ejecting head 22 may be a member, other than the ink cartridge 41 mounted in the printer 11. The supply source of the ink may be, for example, an ink tank which is provided on an external side of an exterior case of the printer 11. In this case, the ink tank which is provided outside the printer 11 can have a larger ink-storing capacity, compared to, for example, the ink cartridge 41 of which the capacity is limited because the ink cartridge 41 is mounted in the printer 11. Thus, it is possible to perform printing on a larger number of paper sheets ST.

In addition, when the ink is supplied, to the liquid ejecting head 22, from an external side of the exterior case of the printer 11, it is necessary to draw an ink supply tube for supplying ink from an outer side to an inner side of the exterior case. Thus, it is preferable that a hole or a notch be formed on the exterior case and the ink supply tube pass through the hole or the notch. Alternatively, a boss or the like may be provided such that an opening/closing body such as a scanner unit or a cover which is openably/closably provided on an exterior case is prevented from being completely closed with respect to the exterior case and the ink supply tube may be drawn from an outer side to an inner side of the exterior case through a gap which is formed by the boss. In this case, it is possible to ensure ink supply to the liquid ejecting head 22 using a flow path of the ink supply tube.

In the embodiment described above, the liquid ejecting apparatus may be a liquid ejecting apparatus that ejects or discharges a liquid other than ink. Furthermore, the small amount of liquid discharged from the liquid ejecting apparatus includes granule forms, teardrop forms, and forms that pull trails in a string-like form therebehind. In addition, the liquid referred to here can be any material capable of being ejected by the liquid ejecting apparatus. For example, any matter can be used as long as the matter is in its liquid phase, including liquids having high or low viscosity, sol, gel water, other inorganic solvents, organic solvents, liquid solutions, liquid resins, and fluid such as liquid metals (metallic melts). Furthermore, in addition to liquids as a single state of a matter, liquids in which the particles of a functional material composed of a solid matter such as pigments, metal particles, or the like are dissolved, dispersed, or mixed in a liquid carrier are included as well. Ink, a liquid crystal or the like is exemplified as a representative example of a liquid in the embodiments described above. In this case, the ink includes a general water-based ink and oil-based ink, other than various liquid compositions of a gel ink, a hot melt ink or the like. A liquid ejecting apparatus which ejects liquid containing material such as an electrode material or a coloring material in a dispersed or dissolved state, which is used for manufacturing a liquid crystal display, an electroluminescence (EL) display, a surface-emitting display, a color filter or the like is exemplified as a specific example of the liquid ejecting apparatus. In addition, the liquid ejecting apparatus may be a liquid ejecting apparatus for ejecting a living organic material used for manufacturing a biochip, a liquid ejecting apparatus for ejecting a liquid as a sample used as a precision pipette, printing equipment, a micro dispenser or the like. Further, the liquid ejecting apparatus may be a liquid ejecting apparatus for precisely ejecting lubricant to a precision machine such as a watch or a camera, or a liquid ejecting apparatus that ejects on a substrate a transparent resin liquid such as an ultraviolet curing resin in order to form a minute hemispherical lens (an optical lens) used in an optical communication element or the like. In addition, the liquid ejecting apparatus may be a liquid ejecting apparatus that ejects an etching liquid such as acid or alkali to etch a substrate or the like.

The entire disclosure of Japanese Patent Application No. 2013-143291, filed Jul. 9, 2013 is expressly incorporated by reference herein.

What is claimed is:

1. A liquid ejecting apparatus comprising:
  a liquid ejecting head having nozzles through which liquid can be ejected;
  a liquid supply path through which the liquid is supplied to the liquid ejecting head; and
  a filter chamber which is disposed in the middle of the liquid supply path and of which an inner portion is divided into a first chamber on a downstream side and a second chamber on an upstream side by a filter which filters the liquid, wherein a liquid inlet through which the liquid is introduced from an upstream side of the liquid supply path to the second chamber of the filter chamber is formed not to face a surface of the filter, which is located on the second chamber side, and wherein a liquid outlet through which the liquid is introduced from the first chamber of the filter chamber to a downstream side of the liquid supply path is formed in an upper position of the first chamber in a vertical direction.

2. The liquid ejecting apparatus according to claim 1, wherein the filter is disposed in the filter chamber to have a height difference.

3. The liquid ejecting apparatus according to claim 1, wherein at least a part of wall surfaces of the second chamber of the filter chamber is constituted by a flexible member.

4. The liquid ejecting apparatus according to claim 3, wherein the flexible member is a thin film member which is disposed to face the filter.

5. The liquid ejecting apparatus according to claim 4, wherein a regulation member which regulates deformation of the flexible member in a direction in which a volume of the second chamber increases is provided outside the second chamber.

6. The liquid ejecting apparatus according to claim 1, wherein, when the filter is set to an upstream filter and the filter chamber is set to an upstream filter chamber, a downstream filter chamber is provided further on a downstream side than the upstream filter chamber of the liquid supply path such that, when the liquid is filtered, an effective area of the upstream filter is set to be greater than an effective area of the downstream filter which is accommodated in the downstream filter chamber.

7. The liquid ejecting apparatus according to claim 6, further comprising:
a pressure adjustment valve which is disposed between the upstream filter chamber and the downstream filter chamber of the liquid supply path and performs an opening/closing operation in accordance with pressure fluctuation on the downstream side, and
a pressure portion which is disposed further on the upstream side of the liquid supply path than the upstream filter chamber and supplies the liquid to the downstream side in a pressurizing manner.

8. A liquid ejecting apparatus comprising:
a liquid ejecting head having nozzles through which liquid can be ejected;
a liquid supply path through which the liquid is supplied to the liquid ejecting head;
a filter portion which is attachably/detachably disposed in the middle of the liquid supply path and has a filter chamber of which an inner portion is divided into a first chamber on a downstream side and a second chamber on an upstream side by a filter which filters the liquid; and
a downstream filter chamber which is disposed further on the downstream side than the filter portion and has a downstream filter for filtering the liquid,
wherein, when the liquid is filtered, an effective area of the filter is set to be greater than an effective area of the downstream filter.

9. The liquid ejecting apparatus according to claim 8, wherein the minimum width of an opening of the filter is equal to or smaller than the minimum width of an opening of the downstream filter.

10. The liquid ejecting apparatus according to claim 8, further comprising:
an on-off valve which is disposed between the filter chamber and the downstream filter chamber of the liquid supply path and performs an opening/closing operation in accordance with pressure fluctuation on the downstream side, and
a pressure portion which is disposed further on the upstream side of the liquid supply path than the filter chamber and supplies the liquid to the downstream side in a pressurizing manner.

11. The liquid ejecting apparatus according to claim 10, wherein the filter portion includes the on-off valve.

* * * * *